United States Patent [19]
Klinefelter

[11] Patent Number: 6,158,278
[45] Date of Patent: Dec. 12, 2000

[54] WIND SPEED DETECTOR ACTUATOR

[75] Inventor: Paul Klinefelter, Richmond, Va.

[73] Assignee: Hunter Industries, Inc., San Marcos, Calif.

[21] Appl. No.: 09/397,039

[22] Filed: Sep. 16, 1999

[51] Int. Cl.$^7$ .................................................. C08G 73/10
[52] U.S. Cl. .................................... 73/170.05; 73/170.07
[58] Field of Search ........................... 73/170.05, 170.07; 340/610, 670–672, 601, 655; 416/17, 109, 119; 200/81 R, 331

[56] References Cited

U.S. PATENT DOCUMENTS

| | | | |
|---|---|---|---|
| 4,050,629 | 9/1977 | Query et al. | 239/11 |
| 4,072,269 | 2/1978 | Berg | 239/1 |
| 4,260,328 | 4/1981 | Hamel | 416/17 |
| 4,548,074 | 10/1985 | Krueter | 73/189 |
| 4,697,737 | 10/1987 | Pearce | 239/67 |
| 4,968,861 | 11/1990 | Kuhn | 200/400 |
| 5,265,469 | 11/1993 | Hall | 73/170.15 |
| 5,340,025 | 8/1994 | Pearce | 239/70 |
| 5,823,433 | 10/1998 | Harlow | 239/67 |

*Primary Examiner*—Benjamin R. Fuller
*Assistant Examiner*—Abdullahi Aw-musse
*Attorney, Agent, or Firm*—Michael H. Jester

[57] ABSTRACT

A device for switching an electrical signal as a function of wind speed that includes a wind vane, a shaft, an actuation unit, an electrical switch, and a reset unit. The shaft is attached to the wind vane such that the wind acting on the wind vane causes the shaft to rotate in a first rotational direction. The shaft has a first, a second, a third, and a fourth shaft position. The electrical switch has a first and a second switch position. The actuation unit, which has an actuation unit biasing element, is capable of engaging the shaft and the electrical switch. The actuation unit supplies a first actuation resistance to shaft rotation at the first shaft position and switches the electrical switch from a first to a second switch position at the second shaft position. The reset unit, which has a reset unit biasing element, is capable of engaging the shaft and supplies a first reset resistance to shaft rotation at the third shaft position. The first actuation resistance to shaft rotation may be varied from a high first actuation resistance to a low first actuation resistance. The first reset resistance to shaft rotation may be varied from a high first reset resistance to a low first reset resistance.

17 Claims, 6 Drawing Sheets

WIND SPEED DETECTOR ACTUATOR

FIELD OF THE INVENTION

This invention relates to a wind speed detector actuator for switching an electrical signal on or off depending upon a variable upper wind speed threshold. More particularly, this invention relates to a wind speed detector actuator for switching an electrical signal on and off depending upon both a variable upper wind speed threshold and a variable lower wind speed threshold. Even more particularly, this invention will switch an electrical signal on and off, for a given setting of wind speed, with a minimum of chattering or unnecessary switching.

BACKGROUND OF THE INVENTION

Automatic sprinkler systems, agricultural chemical spraying or watering systems, water fountains, or any unattended spraying system are typically designed to operate under relatively calm, windless conditions. In these conditions, the sprayed material generally falls within an intended area. However, under windy conditions, the sprayed material may be blown outside the intended area. There exists a general need for a wind speed detector actuator to limit such undesired spray dispersions. In addition, any operating device that might be subjected to windy conditions and that might possibly be damaged if allowed to operate in, excessively windy conditions could benefit from a wind speed detector actuator that limits operation when excessively windy conditions occur. For instance, retractable awnings or umbrellas could be closed when wind conditions threaten to damage them. Similarly, items that might be damaged when exposed to excessively windy conditions, could benefit from a wind speed detector One known controlled sprinkler system provides for the time-delayed interruption and re-institution of spraying under selected wind conditions. Wind speed is sensed above a selected threshold and spray discharge is interrupted after the wind has been maintained above this threshold for a first period of time. When the wind speed drops below the selected threshold, re-institution of the spray discharge is delayed for a second period of time.

Another known wind-governed sprinkler control system is also based upon a time-delayed mechanism. This system actuates a sprinkler system only if wind is not detected during a predetermined time-delay. During operation of the sprinkler system, the detection of wind will cause the sprinkler system to cease operation and the time-delay to again be initiated.

Even another wind controlled spraying apparatus includes a wind sensor for sensing wind from a predetermined plurality of directions. Upon sensing a wind exceeding a predetermined speed from a predetermined direction, a pump is activated for a predetermined spraying time interval.

A further known wind controlled sprinkler system includes a discharge nozzle that is redirected in response to wind direction and speed via a servo control mechanism. The tilt angle of a rotary spray nozzle is constantly and automatically adjusted in response to the wind conditions.

While the wind speed detector actuators described above are useful for shutting off sprinkler systems during periods of high wind, they do not provide a device that is capable of shutting down a sprinkler system or the like, when wind speeds are do not provide a device that is capable of resetting the sprinkler system, when wind conditions are favorable for sprinkling, that, again, is a function of wind speed and is adjustable over a range of wind speeds.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the device of the present invention for switching an electrical signal as a function of wind speed includes a wind vane, a shaft, an actuation unit, an electrical switch, and a reset unit. The shaft is attached to the wind vane such that the wind acting on the wind vane causes the shaft to rotate in a first rotational direction. The shaft has a first, a second, a third, and a fourth shaft position. The electrical switch has a first and a second switch position. The actuation unit, which has an actuation unit biasing element, is capable of engaging the shaft and the electrical switch. The actuation unit supplies a first actuation resistance to shaft rotation at the first shaft position and switches the electrical switch from a first to a second switch position at the second shaft position. The reset unit, which has a reset unit biasing element, is capable of engaging the shaft and supplies a first reset resistance to shaft rotation at the third shaft position. The first actuation resistance to shaft rotation may be varied from a high first actuation resistance to a low first actuation resistance. The first reset resistance to shaft rotation may be varied from a high first reset resistance to a low first reset resistance.

Further, to attain the advantages and in accordance with the purpose of the invention, as embodied and broadly described herein, a method for using a device for switching an electrical signal as a function of wind speed, wherein the switching device has a wind vane, a shaft attached to the wind vane, an actuation unit having an actuation unit biasing element, an electrical switch, and a reset unit having a reset unit biasing element, in accordance with the present invention, includes the following steps: engaging the actuation unit to the shaft with the shaft in a first shaft position; continuously sensing the wind speed with the wind vane; rotating the shaft in a first rotational direction from the first to a second shaft position upon the wind speed reaching an actuation threshold value; switching the electrical signal from a first state to a second state; rotating the shaft in a first rotational direction from the second to a third shaft position; engaging the reset unit to the shaft with the shaft in the third shaft position; and rotating the shaft in the first rotational direction from the third to a fourth shaft position upon the wind speed staying above a reset threshold value, the reset threshold value being less than the actuation threshold value. The method for using a switching device for switching an electrical signal as a function of wind speed may further include the steps of: rotating the shaft in a second rotational direction opposite the first rotational direction from the fourth to the third shaft position upon the wind speed dropping below the reset threshold value; rotating the shaft in the second rotational direction from the third to the second shaft position; switching the electrical signal from the second state to the first state; and rotating the shaft in the second rotational direction from the second to the first shaft position. Furthermore, the actuation unit biasing element may provide a resistance to the rotation of the shaft from the first to the second shaft position. The reset unit biasing element may provide a resistance to the rotation of the shaft from the third to the fourth shaft position. The actuation threshold value may be set to a preselected actuation threshold value from within a range of available actuation threshold values. The reset threshold value may be set to a preselected reset threshold values from within a range of available reset threshold values.

The following detailed description of the invention refers to the accompanying drawings. The following detailed description does not limit the invention. Rather, the scope of the invention is defined by the appended claims.

BRIEF DESCRIPTION OF THE DRAWINGS

The accompanying drawings, which are incorporated in and constitute a part of this specification, illustrate preferred embodiments of the invention, and, together with the description, explain the goals, advantages and principles of the invention. In the drawings.

FIG. 3 is a top view of the embodiment of FIG. 1 (wind vane not shown) in a

DETAILED DESCRIPTION OF THE PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

In accordance with the present invention, a device for switching an electrical signal as a function of wind speed includes a wind vane, a shaft attached to the wind vane, an actuation unit having an actuation unit biasing element, an electrical switch, and a reset unit having a reset unit biasing element.

Figure 1:
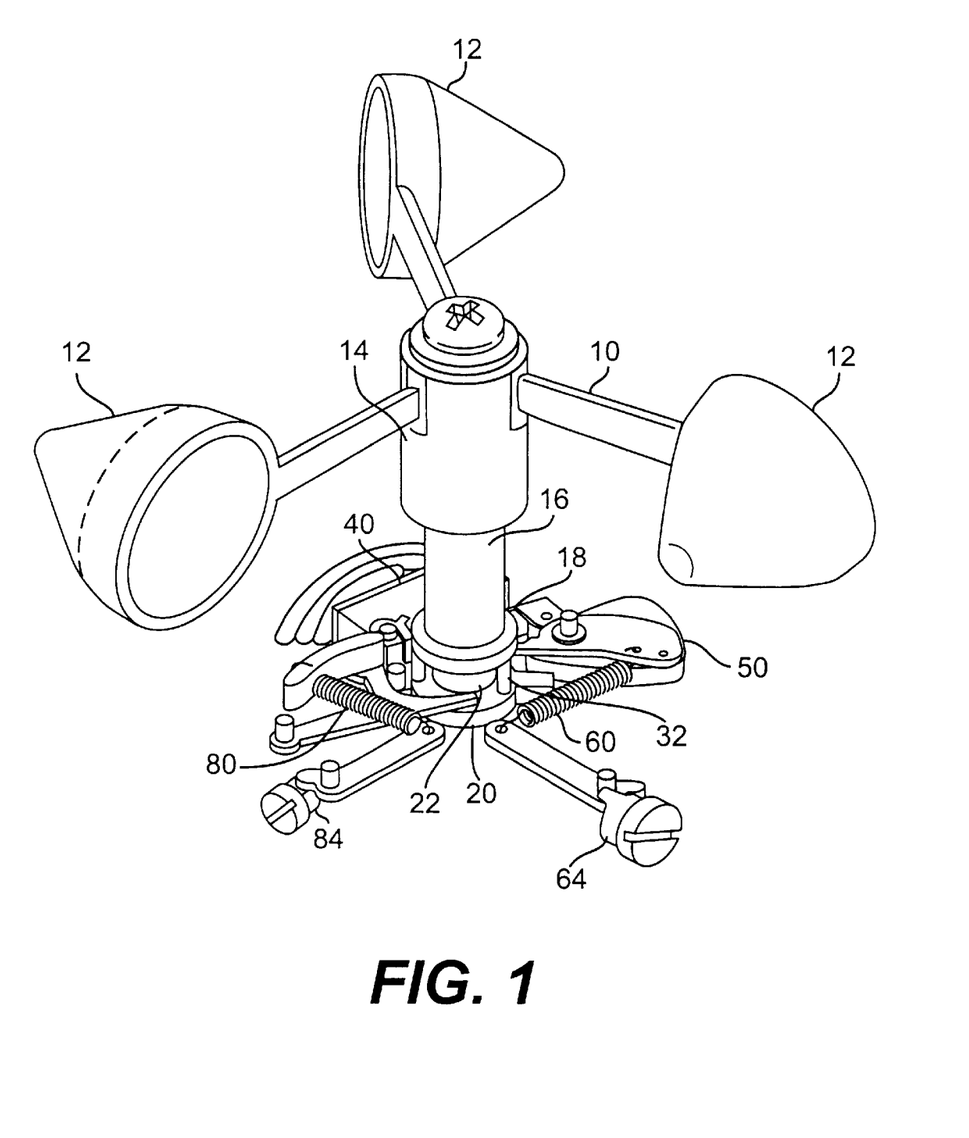
FIG. 1 is a perspective of a first embodiment of the invention (housing not shown)

In the illustrated embodiment, wind vane 10 continuously senses and reacts to the wind speed. As shown in FIG. 1, wind vane 10 is composed of a set of three windcups 12 set around a central axis and spaced 120 degrees apart. In the presence of wind, windcups 12 produce a torque around the central axis. In particular, wind vane 10, as depicted in FIG. 1, would react to an external wind by rotating in a clockwise direction, when looking down from above at the illustrated embodiment.

Other wind vane designs may be used. For instance, the windcups need not actually be cups. Any surface that catches the wind could be used. Moreover, the windcups themselves need not react to the wind by rotating in a preferred direction; a ratchet or other similar device could be used to bias the wind vane to rotate in the preferred direction. The wind vane is preferably made from a material that is durable and corrosion resistant in all types of weather. Possible materials include, but are not limited to, any ultra-violet stabilized thermoplastic such as nylon, acrylonitrile butadiene-styrene (ABS), and polyvinyl chloride (PVC). In addition, in the illustrated embodiment, the individual windcups are removably attached to a wind vane hub 14 and are shown as being easily replaceable should any one of them become damaged.

In accordance with the present invention, a shaft is attached to the wind vane such that the wind acting on the wind vane causes the shaft to rotate in a first rotational direction. The shaft has a first, a second, a third, and a fourth shaft position.

In the illustrated embodiment and as shown in FIG. 1, shaft 16 has an upper end and a lower end. The upper end of shaft 16 is attached to wind vane 10 such that the longitudinal axis of the shaft is aligned with the central axis of the wind vane. Wind acting on the wind vane causes the wind vane to rotate in a first rotational direction, thereby causing the shaft to rotate in a first rotational direction. In the present embodiment, the wind vane and shaft would both rotate in a clockwise direction when looking down at the wind vane from above. The shaft could be attached to the wind vane by any means known to persons skilled in the art; additionally, the shaft could be integrally formed with the wind vane or the hub of the wind vane.

Figure 2:
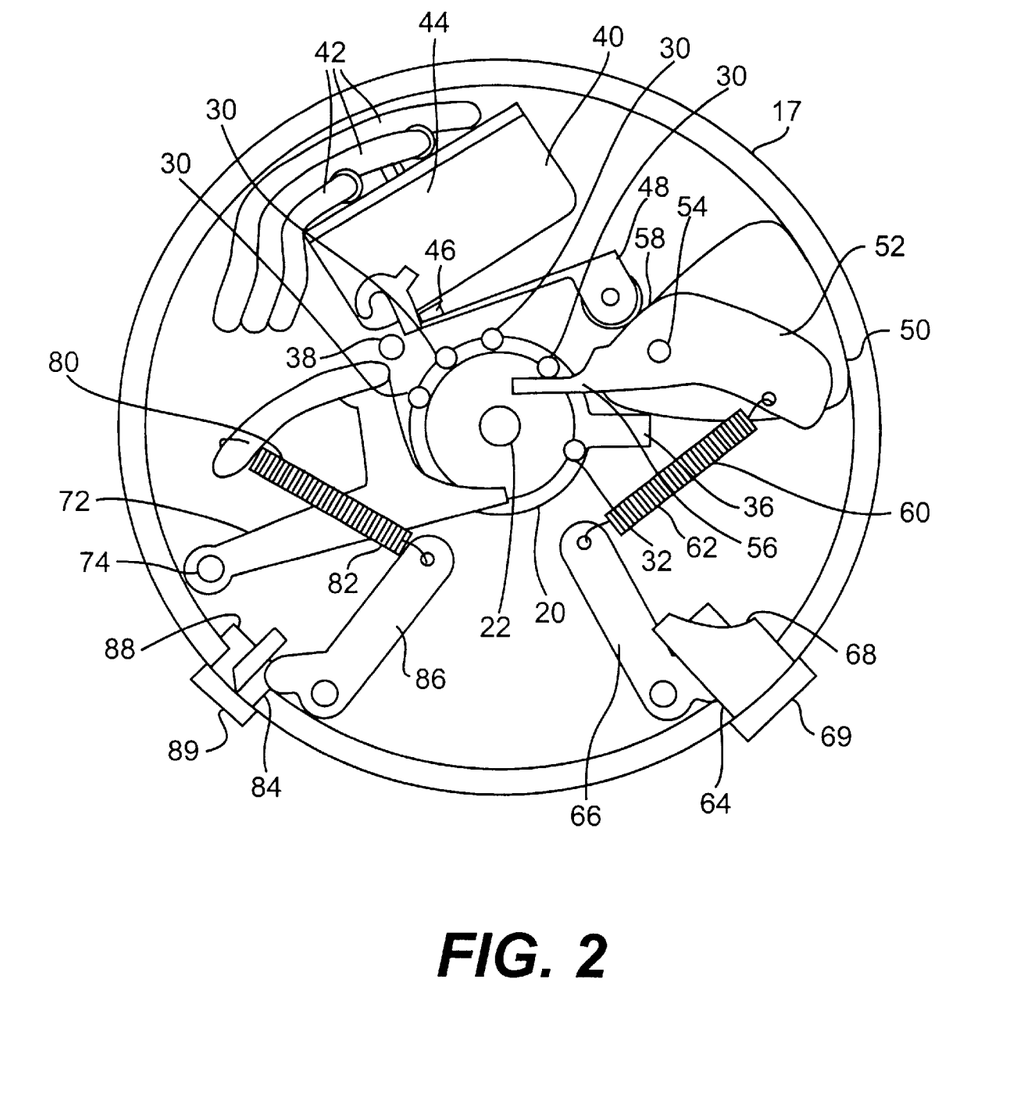
FIG. 2 is a top view of the embodiment of FIG. 1 (wind vane not shown) in a first position.

The upper end of shaft 16 with attached wind vane 10 is located external to housing 17 (shown in FIG. 2). The shaft extends through an opening in the housing such that the lower end of the shaft is internal to the housing. In a preferred configuration, housing 17 is design to fit over common two-inch PVC plumbing or electrical pipe. A bearing (not shown) may support the shaft as it enters the housing and allow for free rotation of the shaft. A seal (not shown) may also be provided between the shaft and the hole in the housing in order to protect the internal mechanism. The seal allows the shaft to freely rotate around its longitudinal axis, while preventing external contaminants, such as water or dirt, from entering the housing. In the preferred configuration, the seal includes wind vane hub 14 extending over the opening in the housing and aiding in the prevention of water or dust getting passed the shaft bearing.

The lower end of shaft 16 is configured for engagement with an actuation unit (as described below) and a reset unit (also as described below). The lower end of the shaft may be formed integrally with the rest of the shaft or the lower end may be separately manufactured and then attached to the rest of the shaft in a separate operation.

As shown in FIG. 1, the lower end of the shaft has upper annular ring portion 18, lower annular ring portion 20, and cylindrical portion 22 therebetween. Upper and the lower annular ring portions 18, 20 and cylindrical portion 22 are all concentric with each other and with the longitudinal axis of shaft 16. The outer circumference of upper and lower annular ring portions 18, 20 is greater than the outer circumference of cylindrical portion 22. The outer circumferences of the annular ring portions and of the cylindrical portion need not be circular, though circular is preferred. Additionally, the outer circumference of the upper annular ring portion need not be equal to the outer circumference of the lower annular ring portion.

The lower end of the shaft is also provided with a shaft camming surface. As best shown in FIGS. 2–5, the shaft camming surface of the present embodiment is formed from a series of small camming cylinders 30. These camming cylinders extend longitudinally from upper annular ring portion 18 to lower annular ring portion 20. The camming cylinders are shown circumferentially arrayed close to the outer circumference of the annular ring portions along an arcuate segment of the annular ring portions. A space is defined between camming cylinders 30 and the outer circumference of cylindrical portion 22 of shaft 16.

The camming cylinders are shown in FIGS. 2–5 as being arrayed along a circular segment that is concentric with the longitudinal axis of the shaft. However, the array of camming cylinders need not be confined to such a circular, concentric path. The camming cylinders are also shown as extending along an arc defined by an included angle of rotation of the shaft of approximately 90 degrees. The length of the shaft camming surface and the value of the included angle of rotation of the shaft are not limited to the specifically embodied values.

Furthermore, the camming cylinders may be capable of rotation around their own longitudinal axis. Small detents (not shown) on the upper surface of the lower annular ring portion and on the lower surface of the upper annular ring portion or pins extending between the upper and lower annular ring portions may be used to pivotably retain the camming cylinders between the upper and lower annular ring portions. Alternatively, the camming cylinders may be fixed, rather than individually rotatable.

Moreover, the shaft camming surface need not be composed of an array of camming cylinders. The shaft camming surface may be composed of an array of longitudinal elements of any convenient cross-section. Alternatively, the shaft camming surface could be formed by a single wall-like element.

The lower end of shaft 16 is further provided with reset trigger 32. As best shown in FIG. 1, reset trigger 32 extends between upper and lower annular ring portions 18, 20 and is located proximate the outer circumference of the annular rings. Reset trigger 32 is also shown located approximately 45 degrees in front of the leading edge of the shaft camming surface. The exact configuration and location of the reset trigger is not limited to that specifically shown in the present embodiment.

Figure 3:
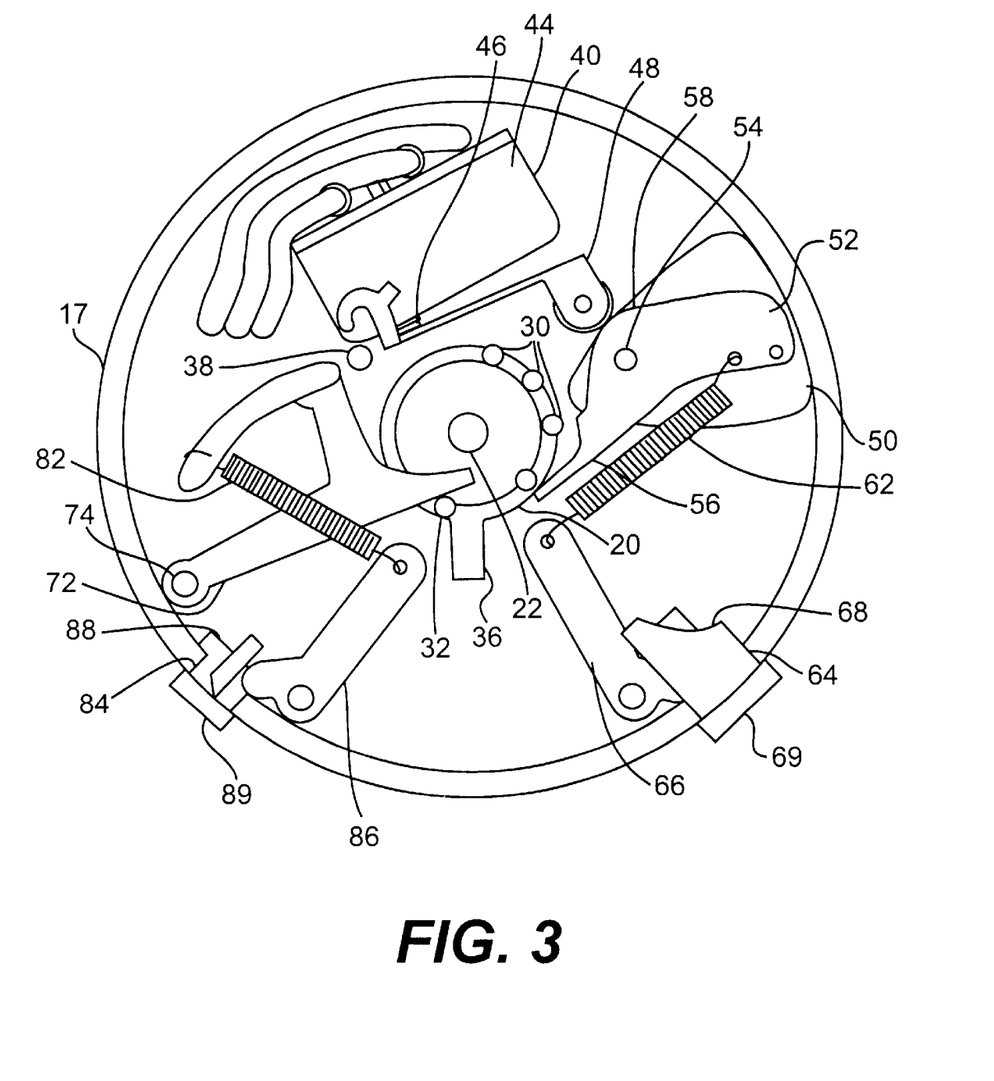

As shown in FIGS. 2–5 the shaft has a first, a second, a third, and a fourth shaft position. The first shaft position, shown in FIG. 2, corresponds to the shaft position when no wind is present or when the actuation wind threshold has not been reached (as will be described below). The second shaft position, shown in FIG. 3, is defined as the rotated orientation of the shaft that corresponds to the electrical switch switching from a first to a second state (also as will be described below). The third shaft position, shown in FIG. 4, corresponds to the reset trigger just contacting the reset unit. The fourth shaft position, shown in FIG. 5, corresponds to the full allowable rotation of the shaft. Stop 36 may be provided on the shaft to positively limiting the rotational travel of the shaft.

The shaft is preferably made from a material that is inexpensive, durable, fatigue resistant, and corrosion resistant in all types of weather. Possible materials include, but are not limited to, ultra-violet stabilized thermoplastics such as nylon, acrylonitrile butadiene-styrene (ABS), and polyvinyl chloride (PVC). Not all parts of the shaft need be made from the same material. Moreover, if not formed as a single integral unit, the separate portions of the shaft may be attached to one another using known methods.

In accordance with the present invention, an electrical switch having a first and a second switch position is provided. Any of a variety of off-the-shelf electrical switches may be used in the present invention. One preferred switch is a snap-action switch, model no. V4NST8, manufactured and supplied by Burgess Switch Co.

In the illustrated embodiment and as shown in FIG. 2, electrical switch 40 is mounted to the floor of housing 17. Wires 42 electrically connect the electrical switch to the device (not shown) being switched on or off as a function of the wind speed. In one typical application, the device being switched on or off is a pump for spraying water. The electrical switch 40 shown in the present embodiment includes switch body 44, on/off button 46 and on/off lever 48 that engages the on/off button. The electrical switch is in the first switch position, as shown in FIG. 2, when on/off lever 48 extends away from switch body 44 such that on/off button 46 is not depressed. The electrical switch is in the second switch position, as shown in FIG. 3, when on/off lever 48 is pushed toward switch body 44 such that on/off button 46 is depressed.

In accordance with the present invention, an actuation unit having an actuation unit biasing element is provided. The actuation unit is capable of engaging the shaft and the electrical switch. The actuation unit supplies a first actuation resistance to shaft rotation at the first shaft position. The actuation unit also switches the electrical switch from a first to a second switch position at the second shaft position.

In the illustrated embodiment and as shown in FIGS. 2–5, actuation unit 50 includes lever/cam unit 52 rotatably coupled to housing 17 by actuation pivot 54. Lever/cam unit 52 includes lever portion 56 that extends towards and is capable of engaging the shaft camming surface, cam portion 58 that extends towards and is capable of engaging electrical switch 40. Lever/cam unit 52 may be formed as separate elements subsequently joined together, or as a single integrally formed unit, as shown in the present embodiment.

The actuation unit further includes actuation unit biasing element 60. In the illustrated embodiment, the actuation unit biasing element is actuation tension spring 62. Other actuation unit biasing elements could be used, such as compression springs, torsion springs, bending elements, elastomeric elements, constant force springs, etc., with corresponding modifications, as necessary, made to the other actuation unit elements.

Figure 6:
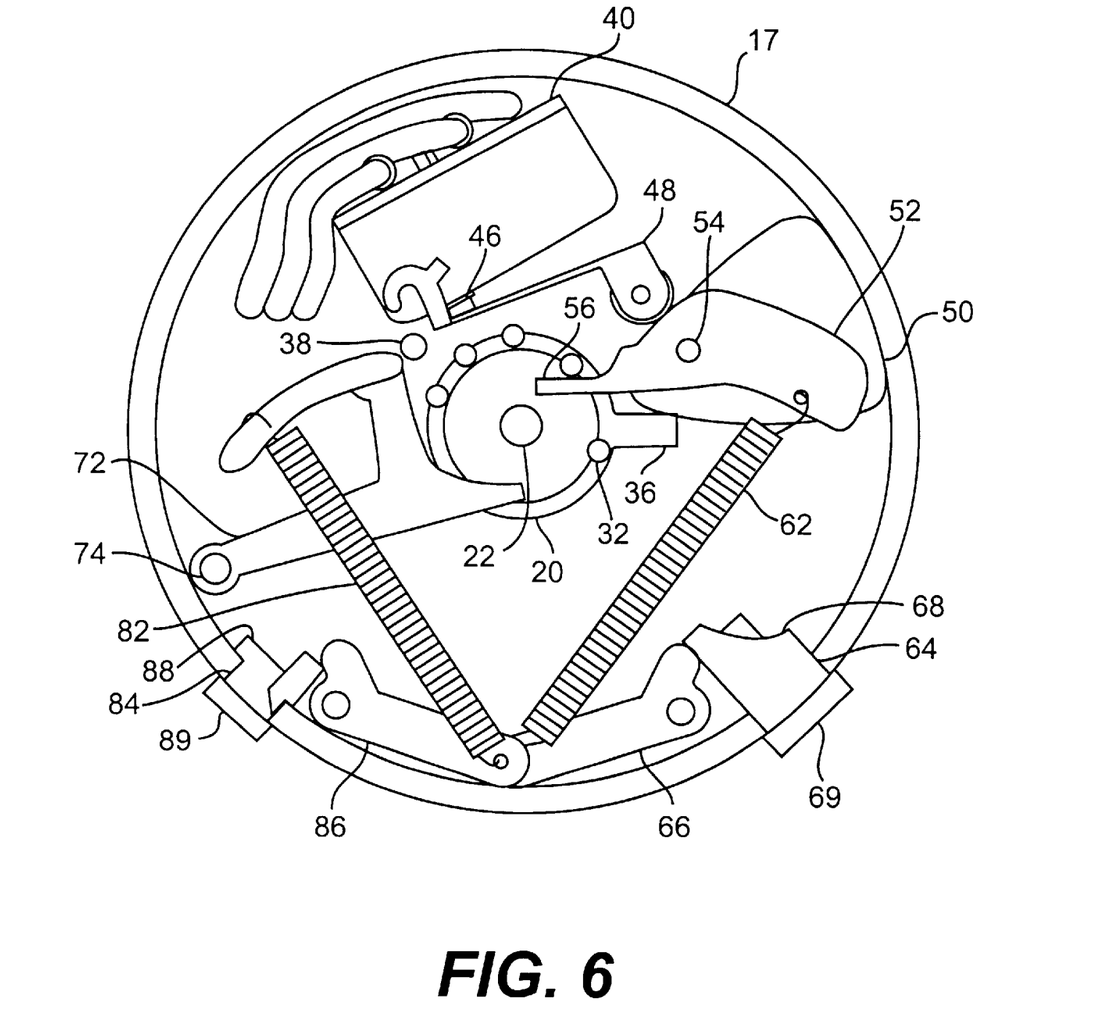
FIG. 6 is a top view of the embodiment of FIG. 1 (wind vane not shown) in the first position with tension springs adjusted to provide maximum resistance.

The actuation unit may further include actuation biasing element adjustment mechanism 64. As best shown in FIGS. 2 and 6, the actuation biasing element adjustment mechanism includes pivotable adjustment arm 66 that slidably engages rotatable, spiral, camming ramp 68, both internal to housing 17, and rotatable knob 69 coupled to the rotatable camming ramp and external to the housing. In order to reduce the exposure of the internal mechanisms to water and dust, the opening in the housing through which the knob-to-camming ramp coupling extends is preferably minimized.

Actuation tension spring 62 extends between lever/cam unit 52 and the end of pivotable adjustment arm 66. Upon rotation of knob 69, camming ramp 68 rotates and adjustment arm 66 slides up or down the camming ramp, depending upon the direction of knob rotation, thereby causing adjustment arm 66 to pivot. As the adjustment arm pivots, the tension in actuation tension spring 62 either decreases or increases, depending upon whether the end of adjustment arm 66 moves towards or away from lever/cam unit 52.

The tension in actuation tension spring 62, acting through the actuation unit when the actuation unit has engaged the shaft camming surface, resists the rotation of the wind vane. Under the action of an external wind, the wind vane will not rotate unless an actuation torque applied to the lever/cam unit by the shaft, as it attempts to rotate with the wind vane, exceeds a resistance torque applied to the lever/cam unit by the actuation tension spring. Thus, the tension in the actuation tension spring, as adjustably set by rotating knob 69 of the actuation biasing element adjustment mechanism, controls the wind speed at which the shaft starts to rotate. This wind speed is referred to as the actuation threshold wind speed.

With shaft 16 in the first position, as best shown in FIG. 2, lever portion 56 extends into the space defined by upper and lower annular rings 18, 20, the outer diameter of cylindrical portion 22, and shaft camming cylinders 30 of the shaft. Cam portion 54 of the lever/cam unit slidably engages on/off lever 48 of electrical switch 40 with the electrical switch in the first position. Actuation tension spring 62, having a first tension force, supplies a resistance torque to rotation of lever/cam unit 52.

In response to a wind acting on the wind vane and exceeding the actuation wind speed threshold, as described above, shaft 16 rotates in a clockwise direction from the first position to the second position. As the shaft starts to rotate clockwise, shaft camming cylinders 30 slidably engage lever portion 56 of lever/cam unit 52, thereby causing the lever/cam unit to rotate counterclockwise around actuation pivot 54.

Furthermore, as the shaft continues to rotate clockwise, the point of contact between lever portion 56 and shaft camming cylinders 30 moves farther away from actuation pivot 54. Thus, for a given, or constant, wind speed, the actuation torque increases.

Two competing events govern the resistance torque applied to lever/cam unit 52 by actuation tension spring 62. First, as lever/cam unit 52 rotates, the tension force in actuation tension spring 62 increases. This event would tend to increase the resistance torque. Second, as the lever/cam unit rotates, the distance between the line of action of the tension spring force and the actuation pivot decreases. This event would tend to decrease the resistance torque. Thus, depending upon the actual load/deflection characteristics of the actuation tension spring and the geometry of the attachment of the actuation tension spring to the lever/cam unit and the end of the pivotable adjustment arm, the resistance torque could slightly increase or decrease, but would generally remain substantially constant.

Finally, as lever/cam unit 52 rotates counterclockwise around actuation pivot 54, camming portion 58 of the lever/cam unit, which engages on/off lever 48 of electrical switch 40, causes the on/off lever to move toward switch body 44.

Because, for a constant wind speed, the actuation torque applied to the lever/cam unit increases and the resistance torque remains substantially constant as the lever/cam unit rotates, chatter of the lever/cam unit and consequently of the electrical switch is avoided. In other words, the wind speed required to initiate rotation of the lever/cam unit is (1) greater than the wind speed required to maintain rotation of the lever/cam unit and (2) greater than the wind speed required to switch the electrical switch from its first to its second switch position.

With the shaft in the second position, as best shown in FIG. 3, lever portion 56 of lever/cam unit 52 extends approximately tangential to shaft camming surface of shaft 16. Cam portion 58 engages on/off lever 48 of electrical switch 40 such that the on/off lever lies proximate switch body 44 and on/off button 46 is depressed.

As described above, the actuation unit generally supplies a first actuation resistance to shaft rotation at the first shaft position, and a second actuation resistance to shaft rotation at the second shaft position. The first actuation resistance is typically greater than the second actuation resistance. Furthermore, the actuation unit generally continuously resists the rotation of the shaft when the shaft rotates in the first rotational direction from the first to the second shaft position.

This first actuation resistance to shaft rotation is capable of being varied from a high first actuation resistance to a low first actuation resistance. The high first actuation resistance to shaft rotation preferably corresponds to a wind speed of 30 to 40 miles per hour acting on the wind vane. The low first actuation resistance to shaft rotation preferably corresponds to a wind speed of 10 to 15 miles per hour acting on the wind vane. Thus, for a typical application, the actuation biasing element adjustment mechanism could provide an actuation threshold wind speed ranging from 10 to 40 miles per hour. However, these typical actuation threshold wind speed ranges are not meant to be limiting, as the present invention could be embodied in very sensitive devices that respond to wind speeds less than 10 miles per hour (say for protecting delicate instruments); in moderately robust devices that respond to wind speeds in excess of 40 miles per hour; or in extremely robust devices that respond to wind speed in excess of a 100 miles per hour (say for use in wind tunnels).

In accordance with the present invention, a reset unit having a reset unit biasing element is provided. The reset unit is capable of engaging the shaft and supplying a first reset resistance to shaft rotation at the third shaft position.

Figure 4:
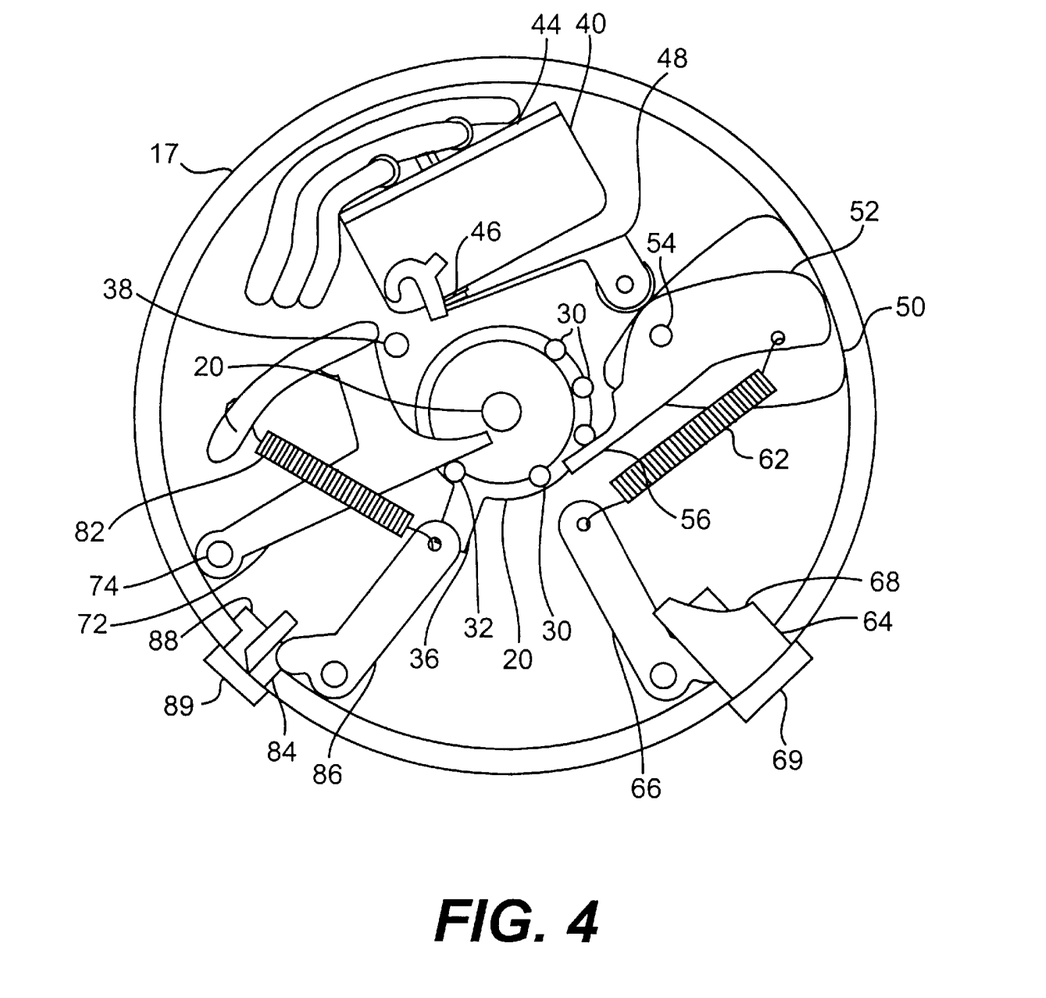
FIG. 4 is a top view of the embodiment of FIG. 1 (wind vane not shown) in a third position.
Figure 5:
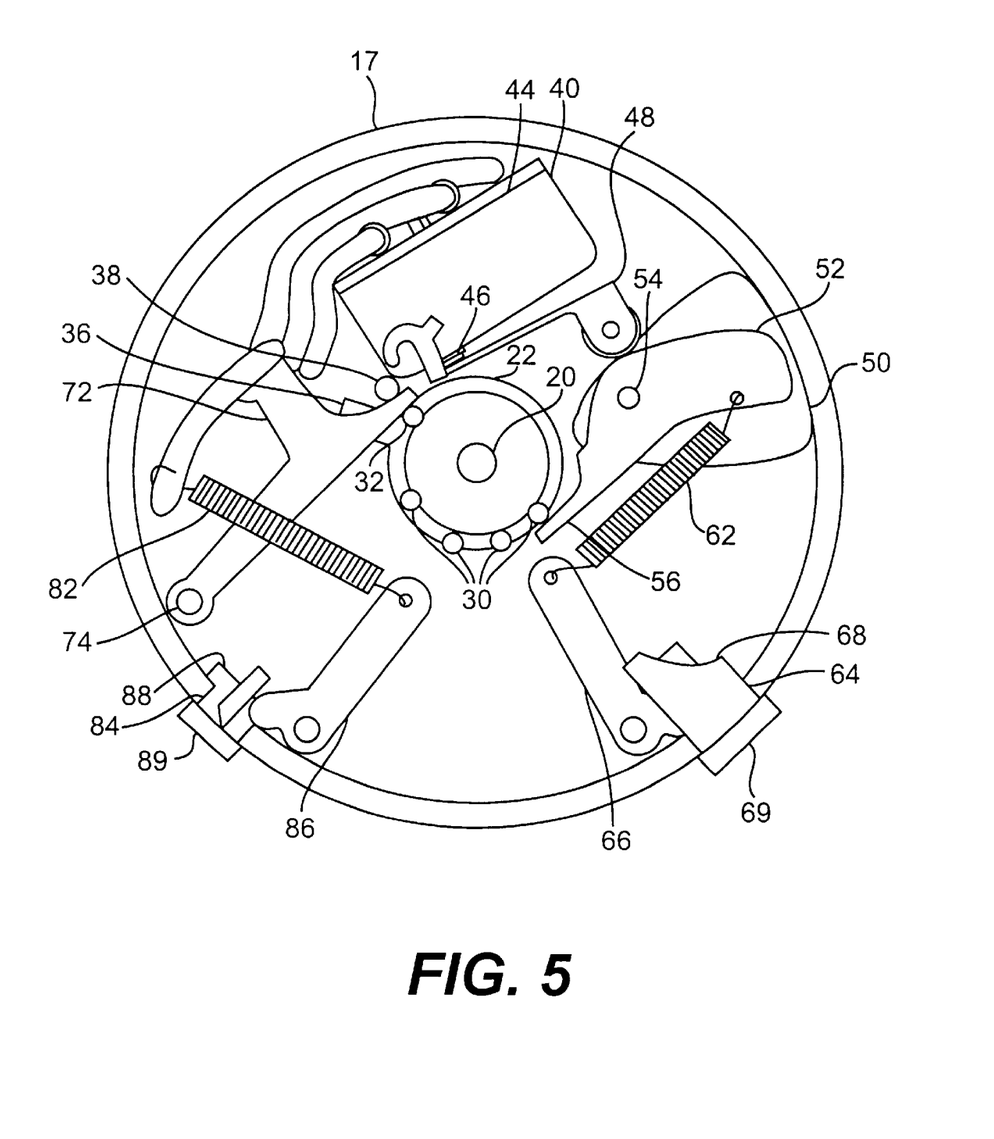
FIG. 5 is a top view of the embodiment of FIG. 1 (wind vane not shown) in a fourth position.

In the illustrated embodiment and as shown in FIG. 4, reset unit 70 includes reset lever 72 rotatably coupled to housing 17 by reset pivot 74. When shaft 16 rotates into the third shaft position, reset lever 72 engages reset trigger 32, which is attached to shaft 16.

The reset unit further includes reset unit biasing element 80. In the illustrated embodiment, the reset unit biasing element is reset tension spring 82. As with the actuation unit, other biasing elements could be used, such as compression springs, torsion springs, bending elements, elastomeric elements, constant force springs, etc., with corresponding modifications made to the other reset unit elements.

In the same manner as the actuation unit, the reset unit may further include reset biasing element adjustment mechanism 84. As best shown in FIG. 4, the reset biasing element adjustment mechanism includes pivotable adjustment arm 86 that slidably engages rotatable, spiral, camming ramp 88, both of which are internal to housing 17, to and rotatable knob 89 coupled to the rotatable camming ramp and external to the housing. As with the actuation unit, the opening in the housing through which the knob-to-camming ramp coupling of the reset unit extends is preferably minimized.

Also similar to the actuation unit, reset tension spring 82 of the reset unit extends between reset lever 72 and the end of pivotable adjustment arm 86. Upon rotation of the knob 89 camming ramp 88 rotates and adjustment arm 86 slides up or down the camming ramp, depending upon the direction of knob rotation, thereby causing the adjustment arm to pivot. As the adjustment arm pivots, the tension in reset tension spring 82 either decreases or increases, depending upon whether the end of the adjustment arm moves towards or away from reset lever 72.

With shaft 16 in the third position, as best shown in FIG. 4, reset lever 72 extends into the space defined by upper and lower annular rings 18, 20 and is engaged by reset trigger 32. Reset tension spring 82, having a first reset tension force, supplies a resistance torque to rotation of the reset lever and thus, supplies a resistance torque to any further rotation of the shaft.

The tension in reset tension spring 82, acting through the reset unit when the reset unit has engaged shaft 16, resists the rotation of the wind vane. Once the reset unit has engaged the shaft, the wind vane will not continue to rotate unless the torque applied to reset lever 72 by the shaft as it attempts to rotate with the wind vane exceeds a resistance torque applied to the reset lever by the reset tension spring. Thus, the tension in the reset tension spring, as adjustably set by rotating knob 89 of the reset biasing element adjustment mechanism, controls the wind speed at which the shaft rotates past the third shaft position. This wind speed is referred to as the reset threshold wind speed.

In response to a wind acting on the wind vane that exceeds the reset wind speed threshold, as described above, shaft 16 may continue to rotate in a clockwise direction from the third position to the fourth position. As the shaft continues to rotate clockwise, reset trigger 32 causes reset lever 72 to rotate counterclockwise around reset pivot 74. As the reset lever rotates, the tension force in reset tension spring 82 increases, thereby increasing reset resistance torque. The amount of increase in the reset resistance torque depends upon the actual load/deflection characteristics of the reset tension spring and the geometry of the attachment of the reset tension spring to the reset lever and the end of pivotable adjustment arm 86.

Under the action of a wind that exceeds the reset wind speed threshold, the shaft may continue to rotate until the fourth shaft position is reached and shaft stop 36 engages housing stop 38.

As described above, the reset unit generally supplies a first reset resistance to shaft rotation at the third shaft position, and a second reset resistance to shaft rotation at the fourth shaft position. The first reset resistance is typically less than the second actuation resistance. Furthermore, the reset unit generally continuously resists the rotation of the shaft when the shaft rotates in the first rotational direction from the third to the fourth shaft position.

This first reset resistance to shaft rotation is capable of being varied from a high first reset resistance to a low first reset resistance. The high first reset resistance to shaft rotation preferably corresponds to a wind speed of 20 to 30 miles per hour acting on the wind vane. The low first reset resistance to shaft rotation preferably corresponds to a wind speed of 5 to 10 miles per hour acting on the wind vane. Thus, for a typical application, the reset biasing element adjustment mechanism could provide an reset threshold wind speed ranging from 5 to 30 miles per hour. However, these typical reset threshold wind speed ranges are not meant to be limiting, and the reset threshold wind speed range would typically be similar to, but less than, the actuation threshold wind speed range.

When the wind speed drops below the reset wind speed threshold, the reset unit will supply a torque to the shaft that causes the shaft to rotate in a second direction, opposite to the first direction, as the shaft rotates from the fourth shaft position to the third shaft position. Rotational inertia will then cause the shaft to continue to rotate from the third shaft position to the second shaft position, at which point, the electrical switch will switch from its second switch position back to its first switch position. Furthermore, at the second shaft position, the shaft re-engages with the actuation unit. The actuation unit, by virtue of the actuation tension spring, applies a torque to the shaft, thereby aiding in the restoration of the shaft from the second to the first shaft position.

It will be apparent to those skilled in the art that various modifications and variations can be made in the methods and apparatus consistent with the present invention without departing from the scope or spirit of the invention. Other modifications will be apparent to those skilled in the art from consideration of the specification and practice of the invention disclosed herein. The specification and examples should be considered as exemplary only, with the true scope and spirit of the invention being indicated by the following claims.

I claim:

1. A device for switching an electrical signal as a function of wind speed, comprising:

a wind vane;

a shaft attached to the wind vane such that the wind acting on the wind vane causes the shaft to rotate in a first rotational direction, the shaft having a first, a second, a third, and a fourth shaft position;

an electrical switch having a first and a second switch position;

an actuation unit having an actuation unit biasing element, the actuation unit configured to engage the shaft and the electrical switch, the actuation unit biasing element configured to supply a first actuation resistance to shaft rotation at the first shaft position, and the actuation unit configured to switch the electrical switch from the first to the second switch position at the second shaft position; and a reset unit having a reset biasing element, the reset unit configured to engage the shaft, and the reset unit biasing element configured to supply a first reset resistance to shaft rotation at the third shaft position and to supply a continuous resistance to the rotation of the shaft when the shaft rotates in the first rotational direction from the third to the fourth shaft position.

2. The device of claim 1 wherein the reset unit biasing element is configured to supply a continuously increasing resistance to the rotation of the shaft when the shaft rotates in the first rotational direction from the third to the fourth shaft position.

3. The device of claim 1 wherein the reset unit biasing element is configured to supply a second reset resistance to shaft rotation at the fourth shaft position, and the second reset resistance is greater than the first reset resistance.

4. The device of claim 1 wherein the reset unit is configured to vary the first reset resistance to shaft rotation from a high first reset resistance to a low first reset resistance.

5. The device of claim 4 wherein the high first reset resistance to shaft rotation preferably corresponds to a wind speed of 20 to 30 miles per hour acting on the wind vane.

6. The device of claim 4 wherein the low first reset resistance to shaft rotation preferably corresponds to a wind speed of 5 to 10 miles per hour acting on the wind vane.

7. The device of claim 1 wherein the reset unit is slidably connected to the shaft and the reset unit is configured to pivot when the shaft rotates in a first rotational direction from the third to the fourth shaft position.

8. The device of claim 1 wherein the angular difference between the third shaft position and the first shaft position is greater than the angular difference between the second shaft position and the first shaft position.

9. A method for using a switching device for switching an electrical signal as a function of wind speed, the switching device including a wind vane, a shaft attached to the wind vane, an actuation unit having an actuation unit biasing element, an electrical switch, and a reset unit having a reset unit biasing element, the method comprising the steps of:

(a) engaging the actuation unit to the shaft with the shaft in a first shaft position;

(b) continuously sensing the wind speed with the wind vane;

(c) rotating the shaft in a first rotational direction from the first to a second shaft position upon the wind speed reaching an actuation threshold value;

(d) switching the electrical signal from a first state to a second state;

(e) rotating the shaft in the first rotational direction from the second to a third shaft position;

(f) engaging the reset unit to the shaft with the shaft in the third shaft position; and (g) rotating the shaft in the first rotational direction from the third to a fourth shaft position upon the wind speed staying above a reset threshold value, the reset threshold value being less than the actuation threshold value.

10. The method of claim 9 wherein in step (c), the actuation unit biasing element provides a resistance to the rotation of the shaft from the first to the second shaft position.

11. The method of claim 10 wherein in step (g), the reset unit biasing element provides a resistance to the rotation of the shaft from the third to the fourth shaft position.

12. The method of claim 9 further including, prior to step (b), the step of:

setting the actuation threshold value to a preselected actuation threshold value from within a range of available actuation threshold values.

13. The method of claim 12 wherein in the step of setting, the setting of the actuation threshold value is accomplished by adjusting the actuation unit biasing element.

14. The method of claim 9 further including, prior to step (b), the step of:

setting the reset threshold value to a preselected reset threshold values from within a range of available reset threshold values.

15. The method of claim 14 wherein in the step of setting, the setting of the reset threshold value is accomplished by adjusting the reset unit biasing element.

16. The method of claim 9 further including, after step (g), the steps of:

(h) rotating the shaft in a second rotational direction opposite the first rotational direction from the fourth to the third shaft position upon the wind speed dropping below the reset threshold value;

(i) rotating the shaft in the second rotational direction from the third to the second shaft position;

(j) switching the electrical signal from the second state to the first state; and (k) rotating the shaft in the second rotational direction from the second to the first shaft position.

17. The method of claim 16 wherein in step (k), the actuation unit biasing element provides an assistance to the rotation of the shaft from the second to the first shaft position.

* * * * *